(12) United States Patent
Yong et al.

(10) Patent No.: US 8,767,530 B2
(45) Date of Patent: Jul. 1, 2014

(54) HIERARCHICAL PROCESSING AND PROPAGATION OF PARTIAL FAULTS IN A PACKET NETWORK

(75) Inventors: Lucy Yong, Tulsa, OK (US); Linda Dunbar, Plano, TX (US); Robert Sultan, Somers, NY (US)

(73) Assignee: Futurewei Technologies, Inc., Plano, TX (US)

( * ) Notice: Subject to any disclaimer, the term of this patent is extended or adjusted under 35 U.S.C. 154(b) by 1549 days.

(21) Appl. No.: 11/672,214

(22) Filed: Feb. 7, 2007

(65) Prior Publication Data
US 2008/0186865 A1 Aug. 7, 2008

(51) Int. Cl.
*H04L 1/00* (2006.01)
*H04L 12/56* (2006.01)

(52) U.S. Cl.
CPC .............. *H04L 45/28* (2013.01); *H04L 47/10* (2013.01)
USPC ....................................................... 370/225

(58) Field of Classification Search
CPC .................................................. H04L 45/28
USPC .............. 370/228, 230, 235.1, 216, 384, 321, 370/227, 231, 232, 242, 389, 225
See application file for complete search history.

(56) References Cited

U.S. PATENT DOCUMENTS

| | | | | |
|---|---|---|---|---|
| 5,629,938 A * | 5/1997 | Cerciello et al. | ............. | 370/384 |
| 5,675,576 A * | 10/1997 | Kalampoukas et al. | ...... | 370/232 |
| 6,163,525 A * | 12/2000 | Bentall et al. | ................. | 370/227 |
| 6,424,624 B1 * | 7/2002 | Galand et al. | ................. | 370/231 |
| 6,778,492 B2 * | 8/2004 | Charny et al. | ................. | 370/228 |
| 6,938,080 B1 | 8/2005 | Kahveci et al. | | |
| 7,002,911 B1 * | 2/2006 | Linville et al. | ................ | 370/230 |
| 7,525,960 B2 * | 4/2009 | Grabner et al. | ................ | 370/389 |
| 7,564,776 B2 * | 7/2009 | Hermsmeyer et al. | ........ | 370/216 |
| 2001/0043575 A1 * | 11/2001 | Kelly | ............................ | 370/321 |
| 2003/0117951 A1 | 6/2003 | Wiebe et al. | | |
| 2003/0161269 A1 * | 8/2003 | Brusamolino et al. | ..... | 370/235.1 |
| 2004/0090915 A1 * | 5/2004 | Zhong et al. | ................... | 370/230 |

(Continued)

FOREIGN PATENT DOCUMENTS

| | | |
|---|---|---|
| CN | 1773952 | 5/2006 |
| EP | 1545071 A1 | 12/2003 |

(Continued)

OTHER PUBLICATIONS

Foreign communication from a counterpart application—International Search Report and Written Opinion, PCT/CN2007/070660, Dec. 20, 2007, 7 pgs.

(Continued)

*Primary Examiner* — Mark Rinehart
*Assistant Examiner* — Gbemileke Onamuti
(74) *Attorney, Agent, or Firm* — Conley Rose, P.C.; Grant Rodolph; Rayhao A. Chung (57) ABSTRACT

A communications network component comprising a processor configured to implement a method comprising sending a fault message including degradation data, wherein the degradation data indicates a bandwidth reduction associated with a partial fault is disclosed. Also disclosed is a method comprising receiving a fault message comprising degradation data associated with a fault, determining whether an available bandwidth is less than a bandwidth reserved for a plurality of connections associated with the fault, and modifying the bandwidth reserved for the connections if the available bandwidth is less than the bandwidth reserved for the connection.

22 Claims, 8 Drawing Sheets

(56) References Cited

U.S. PATENT DOCUMENTS

| | | |
|---|---|---|
| 2004/0228356 A1 | 11/2004 | Adamczyk et al. |
| 2004/0233843 A1* | 11/2004 | Barker .......................... 370/225 |
| 2005/0160171 A1 | 7/2005 | Rabie et al. |
| 2005/0226251 A1 | 10/2005 | Krzanowski et al. |
| 2006/0221839 A1* | 10/2006 | Gross et al. .................. 370/242 |

FOREIGN PATENT DOCUMENTS

| | | |
|---|---|---|
| WO | 00/31929 A2 | 6/2000 |
| WO | 2004043016 A2 | 5/2004 |
| WO | 2006101668 A2 | 9/2006 |

OTHER PUBLICATIONS

Foreign communication from a counterpart application, Chinese application 200780029973.6, Office Action dated Jun. 12, 2010, 7 pages.

Foreign communication from a counterpart application, Chinese application 200780029973.6, Partial English Translation Office Action dated Jun. 12, 2010, 5 pages.

Foreign communication from a counterpart application, EP application 07801068.3, Extended European Search Report dated Mar. 29, 2010, 6 pages.

Foreign communication from a counterpart application, EP application 07801068.3, Office Action dated Aug. 2, 2010, 6 pages.

Foreign Communication From a Related Counterpart Application, European Application 07801068.3, Office Action dated Feb. 8, 2010, 6 pages.

Foreign Communication From a Related Counterpart Application, European Application 07801068.3, Office Action dated Jun. 6, 2011, 8 pages.

Foreign Communication From a Related Counterpart Application, Chinese Application 200780029973.6, Chinese Office Action dated Nov. 9, 2011, 7 pages.

Foreign Communication From a Related Counterpart Application, Chinese Application 200780029973.6, Partial Translation of Chinese Office Action dated Nov. 9, 2011, 6 pages.

* cited by examiner

HIERARCHICAL PROCESSING AND PROPAGATION OF PARTIAL FAULTS IN A PACKET NETWORK

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communication and data networks are comprised of nodes that transport data through the network. The nodes include routers, bridges, and/or switches that select paths for the individual frames to travel through the network. When large amounts of data are to be transported from a common source, A, to a common destination, Z, a logical connection can be established from A to Z and all the data to be transported from A to Z can be mapped to this connection. By doing so, the nodes in the connection no longer need to determine the path to transport the frames. Instead, the nodes merely transport the data to the next node in the connection, which significantly improves the efficiency of data transportation. The data is then transported from node to node through the network until the data arrives at the destination node.

Unfortunately, the nodes and their physical links sometimes suffer from faults. Examples of these faults include breaks in the physical links and node failures. The faults degrade system performance by dropping the data as it is transported through the network. Even if the fault does not cause the data to be dropped, the fault can create an unacceptable decrease in network performance. Specifically, some faults may make a node appear to be operating normally when, in fact, the node only has a fraction of its normal capacity. Thus, an improved system for identifying and responding to network faults is needed.

SUMMARY

In one embodiment, the invention includes a communications network component comprising a processor configured to implement a method comprising sending a fault message comprising degradation data, wherein the degradation data indicates a bandwidth reduction associated with a partial fault.

In another embodiment, the invention includes a method comprising receiving a fault message comprising degradation data associated with a fault, determining whether an available bandwidth is less than a bandwidth reserved for a plurality of connections associated with the fault, and modifying the bandwidth reserved for the connections if the available bandwidth is less than the bandwidth reserved for the connection.

In a third embodiment, the invention includes a network comprising a plurality of at least partially interconnected nodes, an aggregated link connecting two of the nodes, a first tunnel comprising at least some of the nodes and the aggregated link, the first tunnel configured to transport a plurality of service instances, and a second tunnel comprising at least some of the nodes but not the aggregated link, the second tunnel configured to transport the service instances, wherein some of the service instances are rerouted from the first tunnel to the second tunnel when a fault occurs.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques described below, including the exemplary designs and implementations illustrated and described herein, but may be modified within the scope of the appended claims along with their full scope of equivalents.

Described herein is a method for reporting and responding to a fault in a network. Specifically, the method first detects a fault in a network, then either selects some connections to shutdown or creates a fault message containing degradation data that indicates the extent to which the fault affects the bandwidth of the connection to all the connections. In the former case, a policy based connection selection is applied. In the latter case, the connection's ingress node uses the degradation data to modify the bandwidth reserved for the connection so that data loss is reduced. As part of the modification, the ingress node may equally reduce the traffic on all of the affected connections, or may completely shut down at least one of the connections so that the traffic flows in the other connections will be unaffected by the partial fault. After the fault is resolved, the original bandwidth allocation for the connection is restored.

Figure 1:
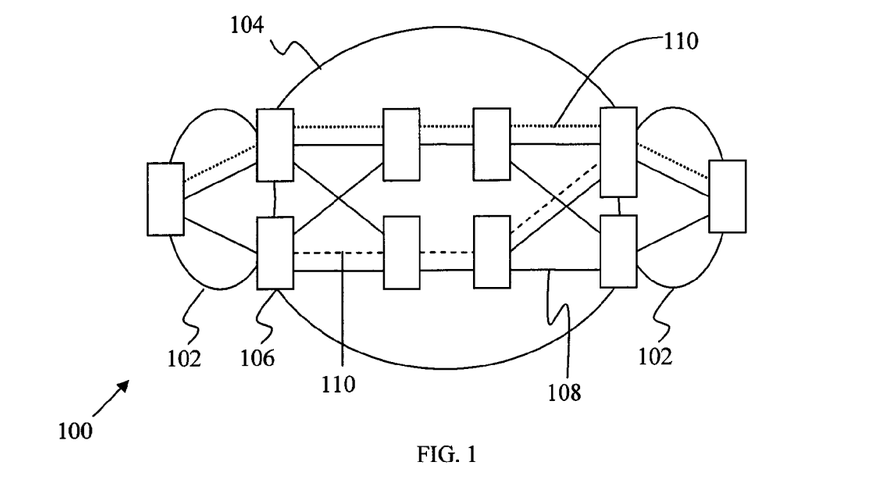
FIG. 1 is a framework of one embodiment of a communications system.

FIG. 1 is an illustration of a general communications system 100. The system 100 comprises a plurality of networks 102, 104 that contain and are connected to each other by a plurality of nodes 106. The nodes 106 communicate with each other via a plurality of links 108. A plurality of logical connect-ion-connections 110 extend across the networks 102, 104. The nodes 106 and the links 108 allow frames to be transported across the network networks 102, 104, perhaps using the connections 110. Each of aforementioned components of the system 100 is described in detail below.

In an embodiment, the networks 102, 104 are any networks that may be used to transport frames between a source and a destination and in which a connection is set up and capacity is reserved for the connection. The networks 102, 104 may be a backbone network, a provider network, or an access network running any one of a variety of protocols. Suitable protocols include Ethernet, Internet Protocol (IP), and Asynchronous Transfer Mode (ATM), among others. In one embodiment, the system 100 may be a hybrid switching network that transports both connection-oriented and connection-less frames, in which case the networks 102 may be provider-bridged networks (PBNs) and the network 104 may be a provider backbone bridged network (PBBN). The networks 102, 104 may have different administrative domains, different transport technologies, or even different providers. For example, the networks 102 may be Ethernet networks and the network 104 may be an IP/multi-protocol label switching—traffic engineered (MPLS-TE) or a provider backbone bridged—traffic engineered (PBB-TE) network. Alternatively, the networks 102, 104 may be any other type of data transport network known to persons of ordinary skill in the art.

The nodes 106 may be any device that transports frames through the system 100. For example, the nodes 106 may include bridges, switches, routers, or various combinations of such devices. The nodes 106 typically contain a plurality of ingress ports for receiving frames from other nodes 106, logic circuitry to determine which nodes 106 to send the frames to, and a plurality of egress ports for transmitting frames to the other nodes 106. In an embodiment, the nodes 106 make the determinations needed to transport the frames through the network at the Open System Interconnection (OSI) layer two level. The nodes 106 may include Backbone Edge Bridges (BEBs), Backbone Core Bridges (BCBs), Provider Edge Bridges (PEBs), Provider Core Bridges (PCBs), or various combinations of such devices. Edge nodes may be connected to nodes 106 within two different networks 102, 104, such as a provider network and a backbone network, while core nodes are typically connected to other nodes 106 within the same network.

The nodes 106 within the system 100 may communicate with each other via a plurality of links 108. The links 108 may be electrical, optical, wireless, or any other type of communications links 108. While it is contemplated that every node 106 within the system 100 may be connected to every other node 106 within the system 100, it is more common to have each of the nodes 106 connected to only some of the other nodes 106 within the system 100 physically, as shown in FIG. 1. Such a configuration reduces the number of the links 108 between the various nodes 106. However, it is possible to have logical links connecting from a node 106 to any other nodes 106 in the network 104.

The system 100 may also contain at least one connection 110. A connection 110 may be a point-to-point logical path between two nodes 106 within the system 100. Frames traveling through the connection 110 may be passed onto the next node 106 within the connection 110 with minimal processing at each node 106. Each connection 110 may be associated with a single network 102, 104, or each connection 110 may be associated with a plurality of networks 102, 104. Generally, the ends of the connection 110 terminate at two edge nodes within the network 102, 104, however it is contemplated that one or both of the ends of the connection 110 may terminate at core nodes. Alternatively, the connection 110 may extend across multiple networks 102, 104, such as from a first customer edge node in a first provider network 102, through a backbone network 104, and to a second customer edge node in a second provider network 102. In specific embodiments, the connection 110 may be an Ethernet Service Provision (ESP) or a pseudo-wire, as defined by IEEE.

Figure 2:
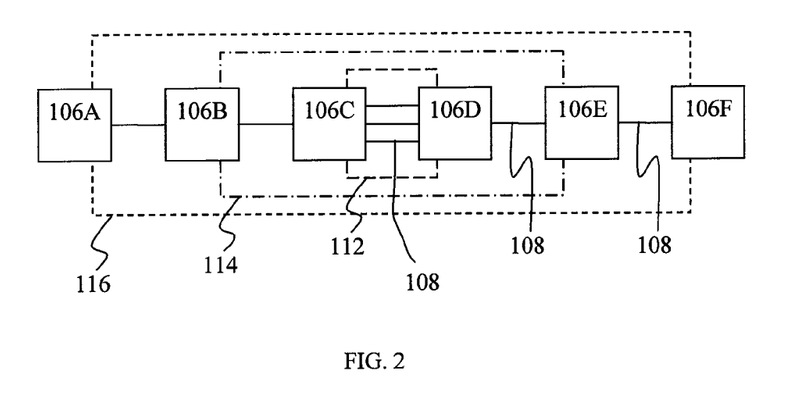
FIG. 2 illustrates one embodiment of the hierarchical relationship of the connections.

The connections 110 described herein may be further classified into a hierarchal relationship. FIG. 2 illustrates one embodiment of the relationship between three types of connections 110: an aggregated link 112, a tunnel 114, and a service instance 116. The aggregated link 112 comprises a plurality of links 108 between two nodes 106C, 106D. The aggregated link 112 is typically located between two BCBs or PCBs, but may be located between any two nodes 106. Aggregated links are beneficial in that they provide increased bandwidth and a redundant connection between the two nodes 106C, 106D. Thus, when one of the links 108 fails, the aggregated link 112 may continue to operate, but at a reduced bandwidth. Such a condition is referred to as a partial fault and is described in U.S. patent application Ser. No. 11/554,367 (the '367 application) filed Oct. 30, 2006 by Dunbar et al. and entitled "Faults Propagation and Protection for Connection Oriented Data Paths in Packet Networks," incorporated by reference herein as if reproduced in its entirety. It is also contemplated that an aggregated link 112 may contain a plurality of nodes 106 and other aggregated links 112.

The system 100 may also contain at least one tunnel 114. Unlike the aggregated link 112 that extends between two nodes 106, the tunnel 114 typically comprises more than two nodes 106. For example, the tunnel 114 shown in FIG. 2 comprises nodes 106B, 106C, 106D, 106E. The tunnel 114 is usually contained within a single network 102, 104, but may extend across a plurality of networks 102, 104, if desired. For example, the tunnel 114 may extend between two BCBs in the same or different networks 102, 104, between two BEBs in the same or different networks 102, 104, or between two PEBs in the same or different networks 102, 104. In an embodiment, the tunnel 114 may also include at least one aggregated link 112, but is not limited as such. It is also contemplated that a tunnel 114 may contain a plurality of other nodes 106 and tunnels 114. Unlike the aggregated link 112 that is merely logical conduits for frames, the tunnel 114 generally includes a plurality of frames transported between two specific nodes.

The system 100 may also contain at least one service instance 116. A service instance 116 may be defined as a flow of frames from one node to another node. Unlike the aggregated link 112 that is merely logical conduits for frames, the service instance 116 generally includes a plurality of frames transported within a tunnel 114. The service instance 116 may extend across a plurality of networks 102, 104 and includes several nodes 106, but is not limited as such. The service instance 116 may also include at least one tunnel 114 and/or at least one aggregated link 112, but may also be a freestanding connection. It is contemplated that a service instance 116 may contain a plurality of nodes 106 and other service instances 116.

The frame may be defined as any unit of data that is transported from a source to a destination through the system 100. The frames may contain various fields, including one or more of the following: a label or stacked label, a source address, a destination address, a type, and a payload. Briefly, the label is used at the node to determine where the frame goes, the source address indicates where the frame originated, the destination address indicates where the frame is going, the type may indicate the forwarding type (connection-oriented or connection-less) and/or the connection associated with the frame, and the payload is the data that the frame is carrying. Specific examples of frames include Ethernet frames, IP packets, ATM cells, and any similar data structures.

Figure 3:
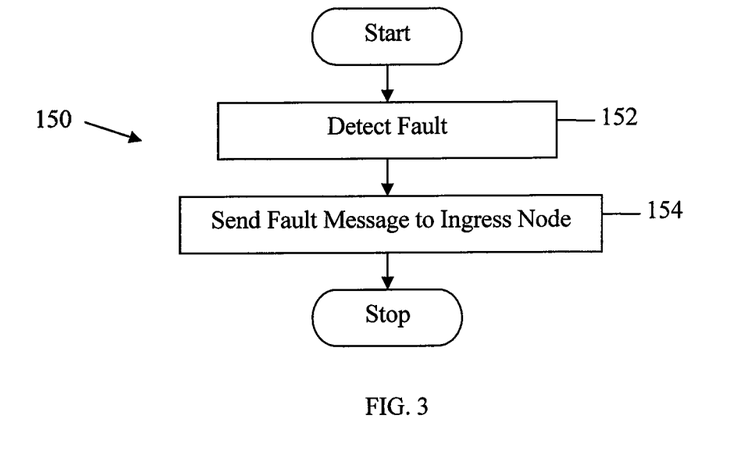
FIG. 3 is a flowchart illustrating one embodiment of an Egress Node Processing Method.

FIG. 3 illustrates one embodiment of an Egress Node Processing Method 150. The Egress Node Processing Method 150 detects faults in the network, such as a failed node, a broken link, or reduced bandwidth. In addition, the Egress Node Processing Method 150 sends fault messages to the ingress nodes associated with the connections affected by the fault to inform the ingress nodes of the extent of the fault. The Egress Node Processing Method 150 is typically implemented at each node. Each of the blocks of the Egress Node Processing Method 150 is discussed in detail below.

The Egress Node Processing Method 150 starts by detecting a fault at 152. In an embodiment, the Egress Node Processing Method 150 may detect a fault by a report from a physical link or by analyzing the ingress ports of the node associated with the connection, and determining whether any of the ports are no longer receiving data or are receiving a reduced amount of data. Such a loss or reduction of incoming data generally indicates a complete or partial fault in a connection. The node may optionally send a message to one or more of the nodes associated with the connection to verify that the connection has partially or complete fault. In an alternative embodiment, the Egress Node Processing Method 150 may detect the fault by receiving a fault message from another node, such as one of the nodes associated with the connection. As discussed in detail below, the fault message may indicate a partial or complete shutdown of the connection. After detecting the fault, the Egress Node Processing Method 150 proceeds to block 154.

The Egress Node Processing Method 150 may send a fault message at 154. In one embodiment, the Egress Node Processing Method 150 has to create the fault message prior to sending the fault message. For example, when the egress node has detected a fault on one of its ports, the egress node may create a fault message that indicates the extent of the fault. If the Egress Node Processing Method 150 received a fault message at 152, then the Egress Node Processing Method 150 may forward a previously received fault message to a node associated with the connection. For example, when a tunnel egress node receives a fault message that indicates that a link aggregation group (LAG) link has a partial fault, the egress node may send the fault message to the nodes associated with the connection. In the event that the fault message needs to be reformatted, repackaged, or otherwise modified to send to the ingress node, such modification steps are included in block 154. After sending the fault message, the Egress Node Processing Method 150 ends.

Figure 4:
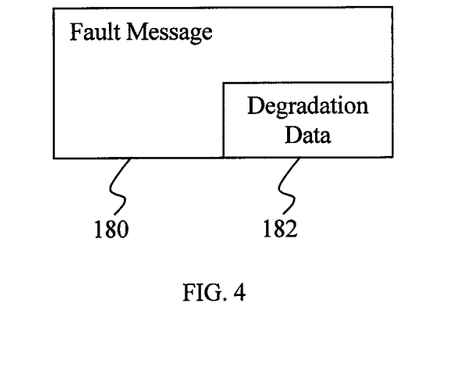
FIG. 4 is a framework of one embodiment of a fault message.

FIG. 4 illustrates one embodiment of a fault message 180. The fault message 180 is a message sent from one node to another node to indicate a fault in the network. In an embodiment, the fault message 180 comprises degradation data 182. The degradation data 182 specifies the extent of a fault in a connection. For example, the degradation data 182 may indicate that one link in a four-link aggregated link has failed, and thus the bandwidth of the aggregated link has been reduced to 75 percent of its normal bandwidth. The degradation data 182 may also indicate that the link has suffered a complete fault, or the degradation data 182 may be excluded from the fault message 180 when the fault is a complete loss of connection. For example, the degradation data may be excluded if all of the links in an aggregated link have failed, and thus the bandwidth of the aggregated link has been reduced to zero.

The fault messages 180 described herein may be classified according to their transmission direction. For example, fault messages 180 traveling in the upstream direction may be referred to as remote defect indications (RDIs), whereas fault messages 180 traveling in the downstream direction can be referred to as alarm indication signals (AISs). In a specific example, a fault message 180 containing the degradation data 182 that is sent upstream may be referred to as a degradation RDI (D-RDI). Similarly, a fault message 180 containing the degradation data 182 that is sent downstream may be referred to as a degradation AIS (D-AIS). In contrast, a fault message 180 lacking the degradation data 182 that is sent upstream may be referred to as a conventional RDI (C-RDI). Likewise, a fault message 180 containing the degradation data 182 that is sent downstream may be referred to as a conventional AIS (C-AIS).

Figure 5:
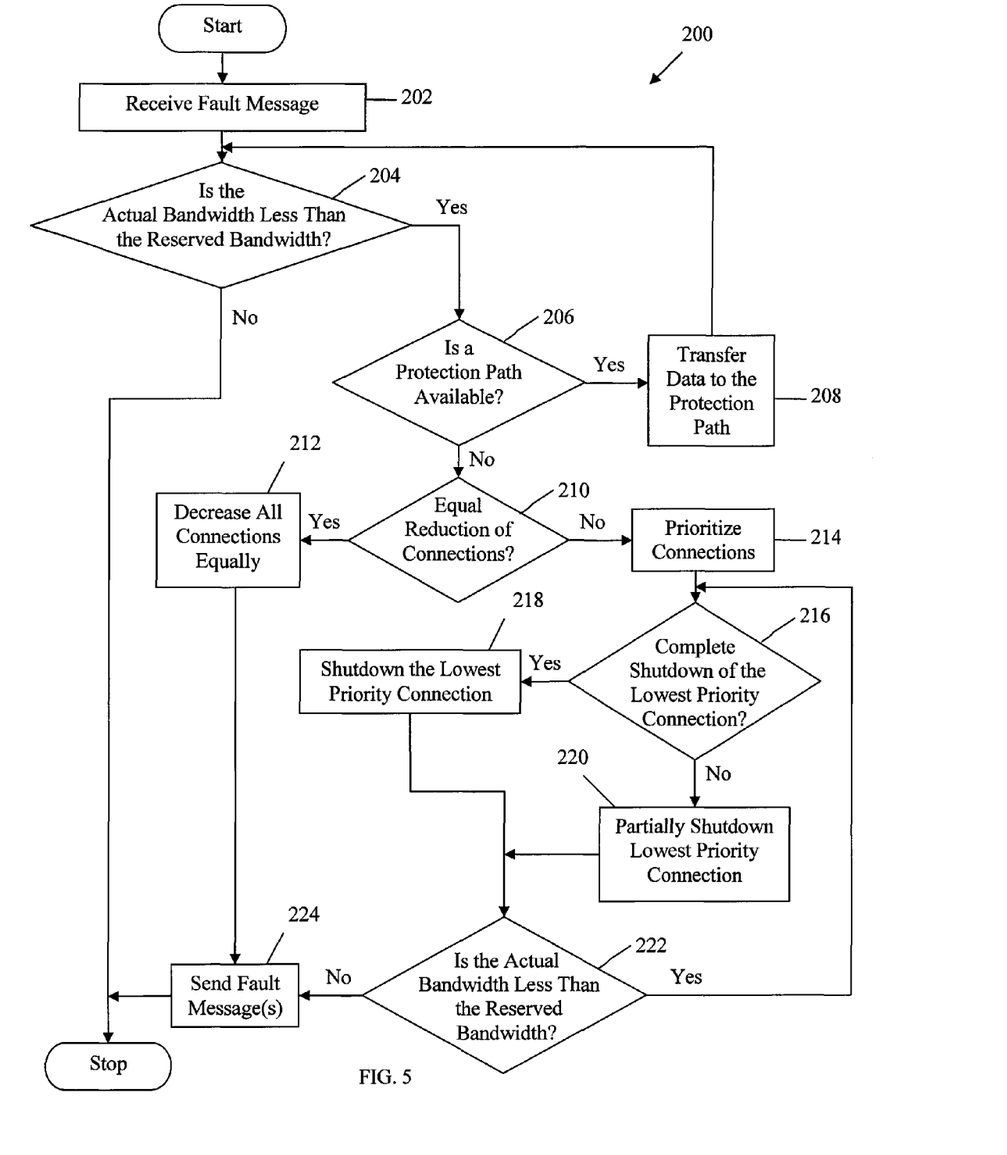
FIG. 5 is a flowchart illustrating one embodiment of an Ingress Node Processing Method.

FIG. 5 illustrates one embodiment of an Ingress Node Processing Method 200. The Ingress Node Processing Method 200 receives fault messages and reroutes the frames to reduce the amount of dropped frames. If protection paths are available, the Ingress Node Processing Method 200 transfers the frames onto the protection path. Otherwise, the Ingress Node Processing Method 200 uses a policy to partially or completely shutdown the connections affected by the fault, and communicates the changes to any affected nodes. The Ingress Node Processing Method 200 is typically implemented at the ingress node of a connection, but may be implemented at any location within the network, for example at an intermediate node or at a centralized location. Each of the blocks of the Ingress Node Processing Method 200 is discussed in detail below.

The Ingress Node Processing Method 200 begins by receiving a fault message at 202. Ingress Node Processing Method 200 may receive the fault message from any node within the network. Egress Node Processing Method 150 will typically receive a fault message from a node connecting the fault point or a node such as the egress node of a connection. For example, the fault message from the egress node may indicate a partial or complete shutdown of the connection between the ingress node and the egress node. The Ingress Node Processing Method 200 then proceeds to block 204.

The Ingress Node Processing Method 200 may then determine whether the actual bandwidth is less than the reserved bandwidth at 204. Specifically, Ingress Node Processing Method 200 may compare the actual bandwidth of the faulty node, link, or connection to the sum of the bandwidths reserved for the various connections associated with the faulty node, link, or connection. If the actual bandwidth is not less than the reserved bandwidth, then the fault does not affect the connection because there is sufficient bandwidth available at the faulty node, link, or connection, and the Ingress Node Processing Method 200 ends. However, if the actual bandwidth is less than the reserved bandwidth, then the connection associated with the faulty node, link, or connection must be modified, and the Ingress Node Processing Method 200 proceeds to block 206.

The Ingress Node Processing Method 200 may then determine whether a protection path is available at 206. A protection path is a connection used to transport at least some of the data in the event that a connection fails. The structure and use of protection paths are described in detail in the '367 application. If a protection path is available, then the Ingress Node Processing Method 200 proceeds to block 208. However, if a protection path is not available, then the Ingress Node Processing Method 200 proceeds to block 210.

The Ingress Node Processing Method 200 may then transfer the frames onto the protection path at 208. When there is a protection path available, the Ingress Node Processing Method 200 may move one, more than one, or all of the connection's frames from the connection onto the protection path. For example, the frames may be moved from a connection suffering a fault to a protection path by redirecting the frames to a different egress port within the node. The Ingress Node Processing Method 200 then returns to block 204.

At block 210, the Ingress Node Processing Method 200 may determine whether to implement an equal reduction of the affected connections. When configuring the network described herein, the administrator may create a policy that describes how to deal with faults when there is insufficient bandwidth. As part of the policy or perhaps in the absence of such a policy, the bandwidth reserved for the connections associated with the fault may be equally decreased across all of the connections. If an equal reduction of the affected connections is to be implemented, then the Ingress Node Processing Method 200 proceeds to block 212. However, if an equal reduction of the affected connections is not to be implemented, for example if the policy dictates otherwise, then the Ingress Node Processing Method 200 proceeds to block 214.

At block 212, the Ingress Node Processing Method 200 may equally decrease all affected connections. In an embodiment, the Ingress Node Processing Method 200 decreases the bandwidth reserved for the affected connections by determining the extent of the decreased bandwidth, and then decreasing the bandwidth reserved for each of the affected connections proportionately on a percentage basis. For example, if there are two tunnels that traverse a link and the link suffers a partial fault such that the link is only able to operate at seventy percent of its normal capacity, then the bandwidth reserved for the two tunnels may be reduced by seventy percent. In another embodiment, the Ingress Node Processing Method 200 decreases the bandwidth reserved for the affected connections by determining the extent of the decreased bandwidth, and then decreasing the bandwidth reserved for each of the affected connections on a capacity basis. For example, if the link suffers a ten Megabit per second (Mbps) reduction in bandwidth and there are two tunnels affected by the bandwidth reduction, then each tunnel may have its bandwidth reduced by five Mbps. The Ingress Node Processing Method 200 then proceeds to block 224.

At block 214, the Ingress Node Processing Method 200 may prioritize the connections at 214. As mentioned above, when configuring the system described herein, the administrator may create a policy that describes how to deal with faults when there is insufficient bandwidth. As part of the policy, the administrator may specify that the connections be prioritized such that high-priority connections maintain their full bandwidth while lower priority connections are configured to be more susceptible to decreased bandwidth. As such, before reducing the bandwidth reserved for any connection, the Ingress Node Processing Method 200 may prioritize the affected connections, for example, by accessing a prioritization table comprising all of the connections within the system and the priority of such connections. The Ingress Node Processing Method 200 then proceeds to block 216.

The Ingress Node Processing Method 200 may then determine whether to implement a complete shutdown of the lowest priority connection at 216. As with blocks 210 and 214, the Ingress Node Processing Method 200 may consult a policy created by the administrator to determine how to deal with the reduced bandwidth. The policy may dictate, in part, whether the lowest priority connection should be partially shutdown or completely shutdown. If the lowest priority tunnel is to be completely shutdown, then the Ingress Node Processing Method 200 proceeds to block 218. However, if the lowest priority tunnel is to be only partially shutdown, then the Ingress Node Processing Method 200 proceeds to block 220.

At block 218, the Ingress Node Processing Method 200 may shutdown the lowest priority connection. If the present node is the ingress node for the connection, the Ingress Node Processing Method 200 may shutdown the connection by redirecting the traffic associated with the connection onto other connections, or combining the traffic associated with the connection with the conventional, connection-less traffic. If the present node is not the ingress node for the connection, the Ingress Node Processing Method 200 may shutdown the connection by sending a fault message to the ingress node of the connection indicating that there is a complete fault along a link associated with the connection. Such a message may be an artificial declaration of a complete fault when the link is suffering from a partial fault, but the policy dictates that the connection be completely shutdown, for example to preserve the bandwidth of the higher priority connections. If, after the connection is completely shutdown, the nodes associated with the connection continue to receive frames associated with the connection, the nodes may drop the frames or mark the frames as eligible to be dropped. Alternatively, the node may modify the frames' association with the connection, for example, by changing the type field within the frame, so that the frames are no longer associated with the connection. The Ingress Node Processing Method 200 then proceeds to block 222.

At block 220, the Ingress Node Processing Method 200 may then partially shutdown the lowest priority connection. If the present node is the ingress node for the connection, the Ingress Node Processing Method 200 may partially shutdown the connection by redirecting some of the traffic associated with the connection onto other connections, or combining some of the traffic associated with the connection with the conventional, connection-less traffic. If the present node is not the ingress node for the connection, the Ingress Node Processing Method 200 may partially shutdown the connection by sending a fault message to the ingress node of the connection indicating that there is a partial fault along a link associated with the connection. If, after the connection is partially shutdown, the nodes associated with the connection continue to receive frames associated with the connection in excess of the reserved bandwidth, the nodes may drop the frames or mark the frames as eligible to be dropped. Alternatively, the node may modify the excess frames' association with the connection, for example, by changing the type field within the frame, so that the frames are no longer associated with the connection. The Ingress Node Processing Method 200 then proceeds to block 222.

The Ingress Node Processing Method 200 may then determine whether the actual bandwidth is less than the reserved bandwidth at 222. The determination at block 222 is similar to the determination at block 204. Specifically, Ingress Node Processing Method 200 may compare the actual bandwidth of the faulty node, link, or connection to the sum of the bandwidths reserved for the various connections associated with the faulty node, link, or connection. If the actual bandwidth is not less than the reserved bandwidth, then there is sufficient available bandwidth, and the Ingress Node Processing Method 200 proceeds to block 224. However, if the actual bandwidth is less than the reserved bandwidth, then the connections associated with the faulty node, link, or connection must be further modified, and then the Ingress Node Processing Method 200 returns to block 216.

The Ingress Node Processing Method 200 may then send a fault message at 224. In one embodiment, the Ingress Node Processing Method 200 has to create the fault message prior to sending the fault message. For example, when the ingress node has modified the bandwidth reserved for the connections or detected a fault, the ingress node may create a fault message that indicates the extent of the reserved bandwidth or the extent of the fault. If the Ingress Node Processing Method 200 received a fault message at 202, then the Ingress Node Processing Method 200 may forward a previously received fault message to a node associated with the connection. For example, when a tunnel ingress node receives a fault message that indicates that a link within a connection has a partial fault, the ingress node may send the fault message to the nodes associated with the connection. In the event that the fault message needs to be reformatted, repackaged, or otherwise modified to send to the ingress node, such modification steps are included in block 224. After sending the fault message, the Ingress Node Processing Method 200 ends.

When a fault occurs, the fault messages should be periodically generated until the partial fault is resolved. Specifically, the ingress nodes should continue to transmit C-AIS or D-AIS messages, and should send connectivity check (CC) messages to the egress nodes to verify connectivity of the connection. Similarly, the egress nodes should continue to check the status of the connections and transmit C-RDI, D-RDI, or CC messages as appropriate to verify the status and connectivity of the connection. When the ingress and egress nodes return to a normal state after being in a partial fault state or a complete fault state, the traffic that was previously on the connection can be moved back onto the connection.

Figure 6:
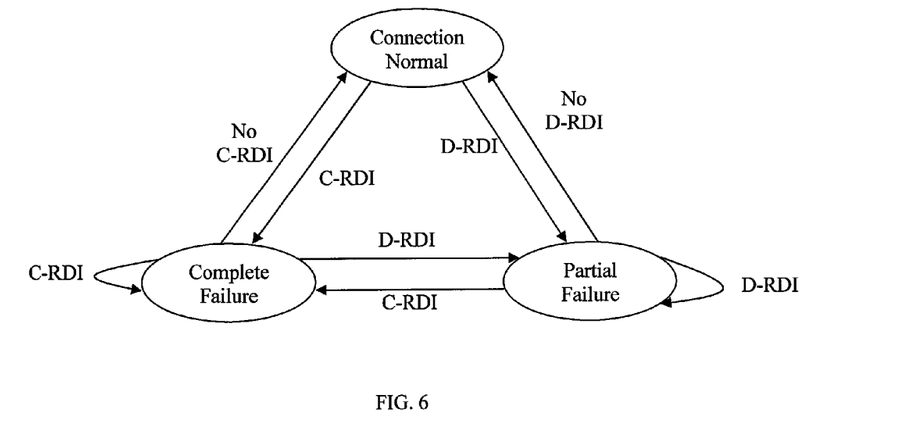
FIG. 6 is an example of a state diagram for the ingress node.

FIG. 6 is a state diagram that illustrates the state of the ingress node under various circumstances. When the ingress node changes the state of a connection, the ingress node may notify any affected nodes of the change in the state of the connection. In FIG. 6, three states are specified: a normal state, a complete fault state, and a partial fault state. When the connection is in the normal state, the connection's ingress node generates periodic CC messages. However, if a D-RDI message is received, then the connection will be changed to the partial fault state. The connection will remain in the partial fault state as long as D-RDI messages continue to be received. The connection will return to the normal state if no further D-RDI messages are received. Alternatively, when at the partial fault state, the connection will progress to a complete fault state if a C-RDI message is received, and will return to the partial fault state if a D-RDI message is received. Returning to the normal state, the connection will change to a complete fault state if a C-RDI message is received. The connection will remain in the complete fault state as long as C-RDI messages continue to be received. The connection will return to the normal state when the C-RDI messages are no longer being received.

Figure 7:
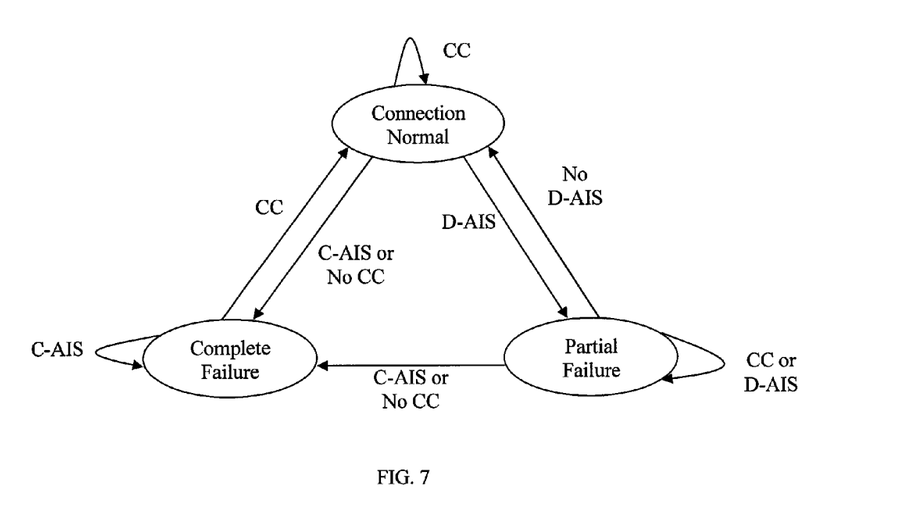
FIG. 7 is an example of a state diagram for the egress node.

FIG. 7 is a state diagram that illustrates the state of the egress node under various circumstances. When the egress node changes the state of a connection, the egress node may notify any affected nodes of the change in the state of the connection. In FIG. 7, three states are specified: a normal state, a complete fault state, and a partial fault state. When a connection is operating normally, the CC messages will be received at regular intervals. However, if a D-AIS message is received, then the connection will be changed to the partial fault state. The connection will remain in the partial fault state as long as D-AIS or CC messages continue to be received. The connection will return to the normal state if no further D-AIS messages are received. Alternatively, the connection will progress to a complete fault state if a C-AIS message is received, or if no CC messages are received after a predetermined amount of time. Returning to the normal state, the connection will change to a complete fault state if a C-AIS message is received, or if no CC messages are received after a predetermined amount of time. The connection will remain in the complete fault state as long as C-AIS messages continue to be received. The connection will return to the normal state when a CC message is received.

FIGS. 8-11 illustrate an example of how the system reroutes traffic in response to a fault. FIGS. 8-11 depict six interconnected nodes 106A, 106B, 106C, 106D, 106E, 106F. Nodes 106C and 106D are connected together by an aggregated link (not shown), whereas normal links (not shown) connect node 106A to node 106B, node 106B to node 106C, node 106D to node 106E, node 106B to node 106E, and node 106E to node 106F. Two tunnels 114A, 114B extend between node 106B and node 106E. In addition, two service instances 116A, 116B extend from node 106A to node 106F.

Figure 8:
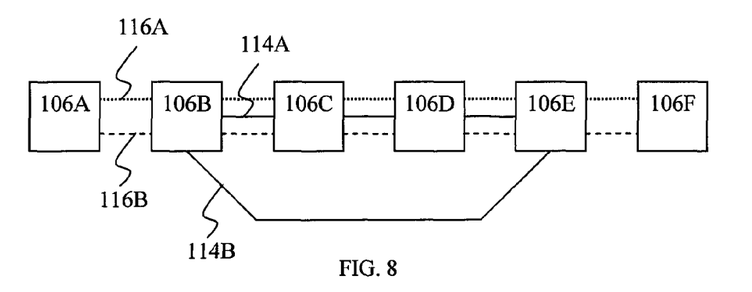
FIG. 8 is an example of a communications system under normal conditions.
Figure 9A:
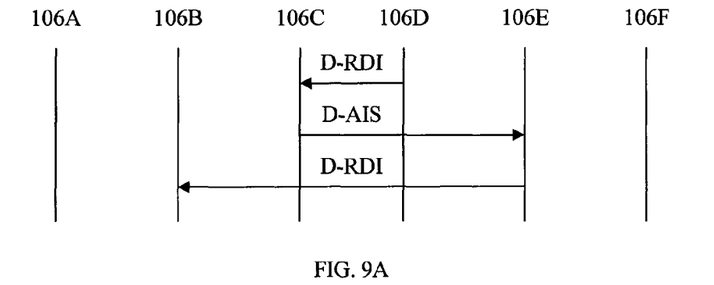
FIG. 9A is an example of the message protocol for the communications system under partial fault conditions.
Figure 9B:
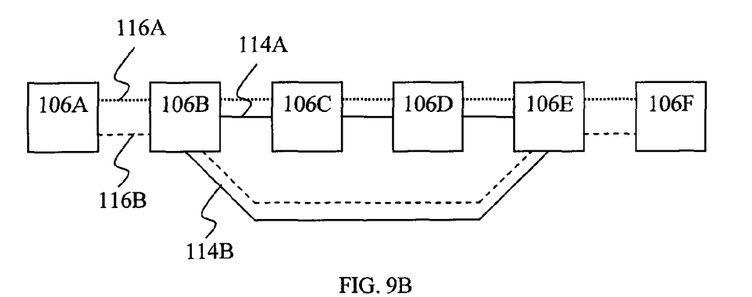
FIG. 9B is an example of the communications system under partial fault conditions.

Under normal circumstances, tunnel 114A carries the service instances 116A, 116B between node 106B and node 106E, as shown in FIG. 8. However, FIGS. 9A and 9B illustrate an example of how the system responds to a partial fault by partially shutting down the tunnel 114A. Specifically, FIG. 9A shows the fault message protocol between nodes 106A, 106B, 106C, 106D. When a partial fault is detected, node 106D sends a D-RDI message to node 106C, who determines that the tunnel 114A should be partially shutdown. As such, node 106C sends a D-AIS message to node 106E, who then sends a D-RDI message to the tunnel 114A ingress node, node 106B. As shown in FIG. 9B, node 106B then shifts service instance 116B to tunnel 114B, thereby reducing or eliminating the amount of dropped frames in the service instances 116A, 116B.

Figure 10A:
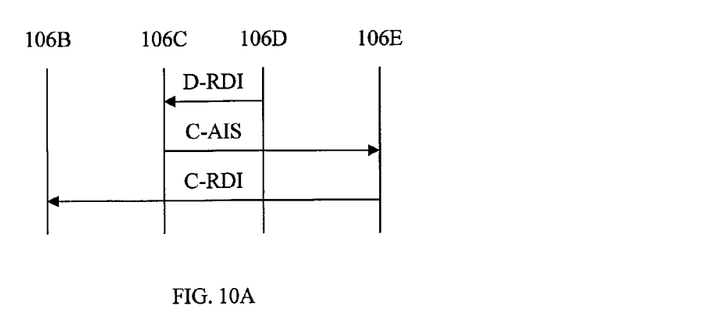
FIG. 10A is another example of the message protocol for the communications system under partial fault conditions.
Figure 10B:
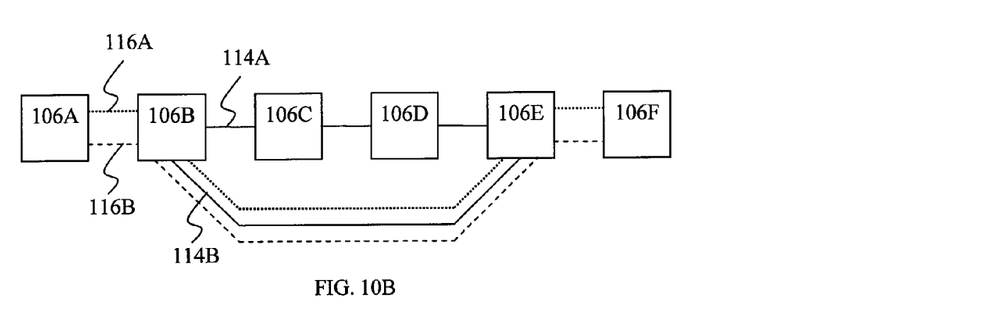
FIG. 10B is another example of the communications system under partial fault conditions.

FIGS. 10A and 10B illustrate another example of how the system responds to a fault by completely shutting down the tunnel 114A. Specifically, FIG. 10A shows the fault message protocol between nodes 106B, 106C, 106D, and 106E. When a partial fault is detected, node 106D sends a D-RDI message to node 106C, who determines that the tunnel 114A should be completely shutdown. As such, node 106C sends a C-AIS message to node 106E, who then sends a C-RDI message to the tunnel 114A ingress node, node 106B. As shown in FIG. 10B, node 106B then shifts both service instances 116A, 116B to tunnel 114B, thereby reducing or eliminating the amount of dropped frames in the service instances 116A, 116B.

Figure 11A:
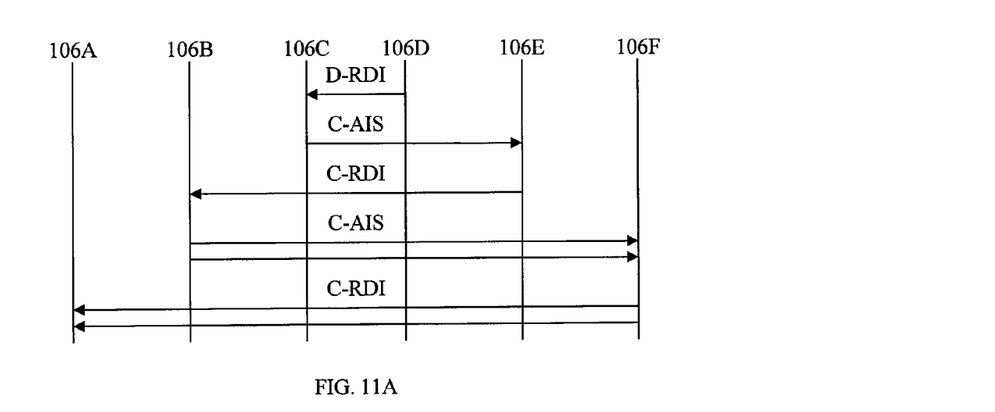
FIG. 11A is another example of the message protocol for the communications system under partial fault conditions.
Figure 11B:
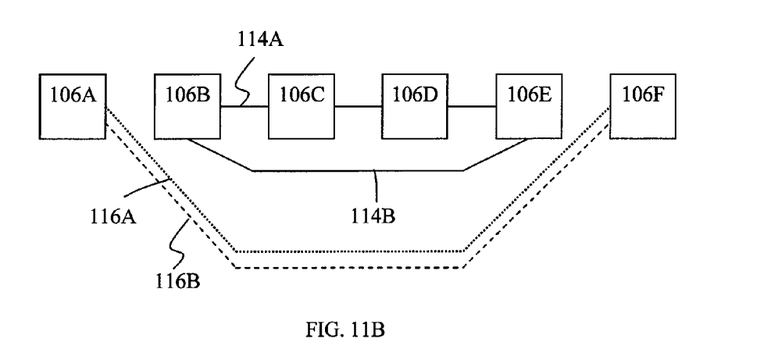
FIG. 11B is another example of the communications system under partial fault conditions.

FIGS. 11A and 11B illustrate another example of how the system responds to a fault by completely shutting down the tunnels 114A, 114B. Specifically, FIG. 11A shows the fault message protocol between nodes 106A, 106B, 106C, 106D, 106E, 106F. When a partial fault is detected, node 106D sends a D-RDI message to node 106C, who determines that the tunnel 114A should be completely shutdown. As such, node 106C sends a C-AIS message to node 106E, who then sends a C-RDI message to the tunnel 114A ingress node, node 106B. Node 106B responds by sending two C-AIS messages to node 106F, one for each tunnel 114A, 114B. In addition, node 106B sends two C-RDI messages to node 106A, one for each service instance 116A, 116B. As shown in FIG. 11B, node 106A then shifts both service instances 116A, 116B away from tunnels 114A, 114B, thereby reducing or eliminating the amount of dropped frames in the service instances 116A, 116B.

Figure 12:
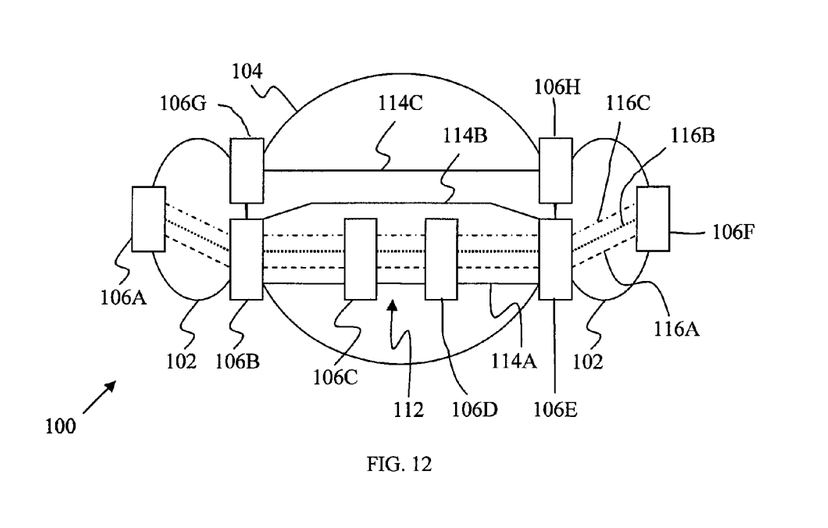
FIG. 12 is an example of another communications system under normal conditions.
Figure 13:
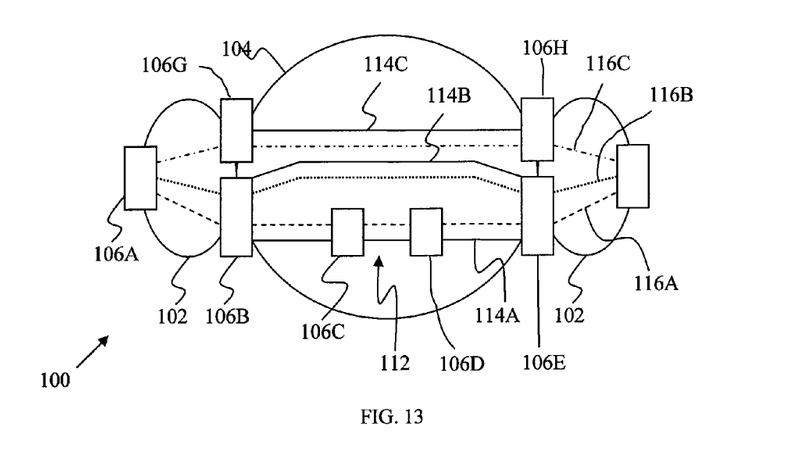
FIG. 13 is an example of the other communications system under partial fault conditions.

FIGS. 12-13 illustrate another example of how the system reroutes traffic in response to a fault. FIGS. 12-13 depict eight interconnected nodes 106A, 106B, 106C, 106D, 106E, 106F, 106G, 106H. Nodes 106C and 106D are connected together by an aggregated link (not shown), whereas normal links (not shown) connect node 106A to node 106B, node 106B to node 106C, node 106D to node 106E, node 106E to node 106F, node 10613 to node 106E, node 106A to node 106G, node 106G to node 106H, and node 106H to node 106F. Two tunnels 114A, 114B extend between node 106B and node 106E, and one tunnel 114C extends between node 106G and node 106H. In addition, three service instances 116A, 116B, 106C extend from node 106A to node 106F.

Under normal circumstances, tunnel 114A carries the service instances 116A, 116B, 116C between node 106B and node 106E, as shown in FIG. 12. However, FIG. 13 illustrates an example of how the system responds to a partial fault by partially shutting down the tunnel 114A. Specifically, service instance 116B is shifted to tunnel 114B and service instance 116C is shifted to tunnel 114C, thereby reducing or eliminating the amount of dropped frames in the service instances 116A, 116B, 116C.

Figure 14:
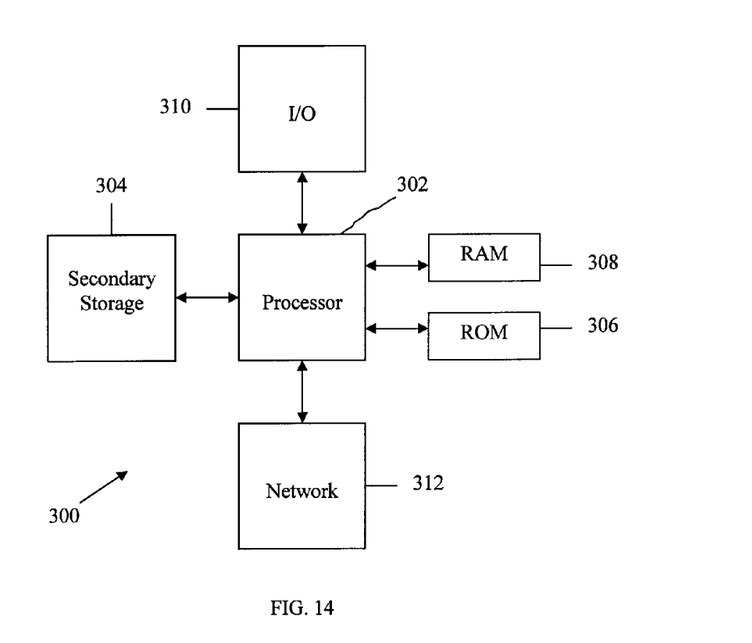
FIG. 14 is a framework of one embodiment of a general-purpose network component.

The network described above may be implemented on any general-purpose network component, such as a computer, router, switch, or bridge, with sufficient processing power, memory resources, and network throughput capability to handle the necessary workload placed upon it. FIG. 14 illustrates a typical, general-purpose network component suitable for implementing one or more embodiments of a node disclosed herein. The network component 300 includes a processor 302 (which may be referred to as a central processor unit or CPU) that is in communication with memory devices including secondary storage 304, read only memory (ROM) 306, random access memory (RAM) 308, input/output (I/O) devices 310, and network connectivity devices 312. The processor 302 may be implemented as one or more CPU chips.

The secondary storage 304 is typically comprised of one or more disk drives or tape drives and is used for non-volatile storage of data and as an over-flow data storage device if RAM 308 is not large enough to hold all working data. Secondary storage 304 may be used to store programs that are loaded into RAM 308 when such programs are selected for execution. The ROM 306 is used to store instructions and perhaps data that are read during program execution. ROM 306 is a non-volatile memory device that typically has a small memory capacity relative to the larger memory capacity of secondary storage 304. The RAM 308 is used to store volatile data and perhaps to store instructions. Access to both ROM 306 and RAM 308 is typically faster than to secondary storage 304.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A communications network component comprising:
a processor configured to:
monitor a plurality of parallel links that connect a first node to a second node, wherein the links carry data for a path through the network, and wherein an original bandwidth reserved for the path is less than an available capacity of the links when no faults are present;
detect a partial fault caused by a failure along one of the links, wherein the partial fault reduces the available capacity of the links;
send a fault message regarding the path, wherein the fault message indicates that an available bandwidth for the path is greater than zero but less than the original bandwidth reserved for the path,
wherein responsive to sending the fault message, the original bandwidth reserved for the path is modified such that a total bandwidth reserved for the path is reduced to be less than or equal to the available bandwidth indicated by the fault message, and
wherein the available bandwidth for the path corresponds to the reduced available capacity of the links following the failure along one of the links.

2. The communications network component of claim 1, wherein the fault message further indicates the location of the partial fault, wherein the link is an electrical link, and wherein the original bandwidth is modified by rerouting the data designated for the path to a second path.

3. The communications network component of claim 1, wherein the partial fault is detected by analyzing the frames received on an ingress port.

4. The communications network component of claim 1, wherein the fault message is a remote defect indication (RDI) message, and wherein the link is an optical link.

5. The communications network component of claim 1, wherein the bandwidth reserved for the path is modified when the reduced available bandwidth is less than the bandwidth reserved for the path prior to modifying the bandwidth reserved for the path.

6. The communications network component of claim 1, wherein a link one or more of the plurality of parallel links comprises a plurality of intermediate nodes between the egress and ingress ports of the first and second nodes, and wherein the failure of at least one of the intermediate nodes reduces the available capacity of the links.

7. The communications network component of claim 1, wherein a break in one or more of the plurality of parallel links reduces the available capacity of the links.

8. The communications network component of claim 1, wherein one or more of the plurality of parallel links is coupled at a first end to an ingress port of a first node and at a second end to the egress port of a second node, and wherein failure of the ingress or egress port reduces the available capacity of the links.

9. A communications network component comprising:
a processor configured to:
receive a fault message comprising an indication of a partial fault along a path and an indication of an available bandwidth of the path subsequent to the partial fault, wherein the path comprises a plurality of parallel links that carry a plurality of data streams from a first node to a second node, wherein one of the links comprises an intermediate node positioned between the first node and the second node, and wherein the failure of the intermediate node causes the partial fault along the path;
determine that the available bandwidth is greater than zero but less than a total bandwidth reserved for the path; and
modify the total bandwidth reserved for the path, wherein modifying the total bandwidth reserved for the path comprises reducing the bandwidth reserved for some of the data streams without reducing the bandwidth reserved for the other data streams,
wherein the total bandwidth reserved for the path is modified such that the total bandwidth reserved for the path is reduced to be less than or equal to the available bandwidth indicated by the fault message, and
wherein the available bandwidth indicated by the fault message corresponds to the reduced available capacity of the links following the failure along one of the links.

10. The communications network component of claim 9, wherein reducing the bandwidth reserved for some of the data streams comprises proportionately reducing the bandwidth reserved for the reduced data streams on a percentage basis.

11. The communications network component of claim 9, wherein reducing the bandwidth reserved for some of the data streams comprises proportionately reducing the bandwidth reserved for the reduced data streams on a capacity basis.

12. The communications network component of claim 9, wherein reducing the bandwidth reserved for some of the data streams comprises prioritizing the data streams and reducing the bandwidth reserved for lower priority data streams before reducing the bandwidth reserved for higher priority data streams.

13. The communications network component of claim 9, wherein reducing the bandwidth reserved for some of the data streams comprises shutting down one or more of the reduced data streams.

14. The communications network component of claim 9, wherein modifying the bandwidth reserved for the path further comprises transferring at least some of the frames associated with one or more of the data streams onto a protection path that is distinct from the path, and wherein the reserved bandwidth is modified by rerouting data from a service instance from the path to a second path in response to detection of the partial fault.

15. The communications network component of claim 9, wherein the available bandwidth is not less than the modified bandwidth reserved for the paths.

16. The communications network component of claim 9, wherein the processor is further configured to send an alarm indication signal (AIS) message to a node associated with one of the reduced links, and wherein the AIS message specifies a modification to the bandwidth reserved for the reduced link.

17. The communications network component of claim 9, wherein the fault message is a remote defect indication (RDI) message.

18. The communications network component of claim 9, wherein one of the links exists within another one of the links.

19. The communications network component of claim 9, wherein modifying the total bandwidth reserved for the path is performed in response to receiving the fault message.

20. A network comprising:
an ingress node;
an egress node;
an aggregated link connecting the ingress node to the egress node and having an available bandwidth when no fault is present on the aggregated link, wherein one end of a link connects to an egress port of the ingress node and an opposite end of the link connects to the ingress port of the egress node;
a first tunnel comprising the ingress node, the aggregated link, and the egress node, wherein the first tunnel is configured to transport a plurality of service instances over the aggregated link at a rate not greater than a reserved bandwidth, and wherein the reserved bandwidth is not greater than the available bandwidth when no fault is present on the aggregated link; and
a second tunnel comprising the ingress node and the egress node, but not the aggregated link, wherein the second tunnel is configured to transport at least some of the service instances when the first tunnel is unable to transfer all or some of the service instances,
wherein failure of the ingress port or the egress port causes a partial fault along the path that reduces the available bandwidth such that the reduced available bandwidth is greater than zero but less than the reserved bandwidth,
wherein the reserved bandwidth is modified by rerouting at least some of the service instances from the first tunnel to the second tunnel in response to detection of the partial fault,
wherein modifying the reserved bandwidth reduces the reserved bandwidth to be less than or equal to the reduced available bandwidth, and
wherein the reduced available bandwidth corresponds to the reduced available capacity of the aggregated links following the failure of the ingress port or the egress port.

21. The network of claim 20, wherein at least some of the service instances are not rerouted to the second tunnel, and wherein the first tunnel continues to transport at least a portion of some of the service instances that are not rerouted to the second tunnel.

22. The network of claim 20, wherein modifying the reserved bandwidth further comprises:
determining that the second tunnel has reached its available carrying capacity after rerouting at least some of the service instances from the first tunnel to the second tunnel, wherein no additional service instances are rerouted to the second tunnel upon determining that the second tunnel has reached its available carrying capacity; and
dropping at least some of the frames associated with one or more service instances that were not rerouted to the second tunnel when the reduced available bandwidth remains less than the reserved bandwidth after determining that the second tunnel has reached its available carrying capacity.

* * * * *